United States Patent Office 3,021,372
Patented Feb. 13, 1962

3,021,372
LOW FOAM, HIGH WETTING POLYPROPYLENE-TERMINATED ALKYLPHENOXYPOLYETHOXY-ALKANOLS
Jean Dupre, Levittown, and Robert E. Wolfrom, Jenkintown, Pa., assignors to Rohm & Haas Company, Philadelphia, Pa., a corporation of Delaware
No Drawing. Filed July 16, 1959, Ser. No. 827,465
6 Claims. (Cl. 260—613)

This invention is concerned with specific alkylphenoxypolyethoxyalkanols as new compositions of matter. In particular, it relates to such compositions which have a good balance of low foam and adequate wetting at room temperature.

The compounds of this invention may be represented by the formula

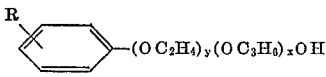

in which

R is an alkyl group of 8 or 9 carbon atoms,
$x$ is equal to a number ranging from 5.8 to 20,
$y$ is an integer from 5 to 10,
and
$x/y$ is a ratio which may be represented by a number from 1.2 to 2.1.

R may represent an octyl or nonyl group, exhibiting any of the known spatial configurations such as normal, iso, tertiary, and the like. R may occupy any possible ring location, although the preferable one is the para position with respect to the ether chain.

As indicated above, the symbol $x$ represents a fixed number of from 5.8 to 20 units of propylene oxide. The symbol $y$ represents a fixed number of ethylene oxide units of from 5 to 10. Within the definitions of $x$ and $y$, the indicated relationship of $x/y$ equaling a number in the range of from 1.2 to 2.1 is highly critical and must be strictly observed.

It is necessary in the present compounds that the oxyethylene groups be positioned adjacent to the benzene ring and that the oxypropylene groups be terminally located at the opposite end of the chain from the benzene ring. The desired results can only be obtained by strict adherence to this specific structure. It should be understood, however, that we are not claiming this particular feature of our compositions as being novel; for it was first disclosed in a copending application Serial No. 624,-982, which was filed on November 29, 1956, and which was issued as U.S. Patent No. 2,903,486 on September 8, 1959, for new compositions of matter comprising certain alkylphenoxypolyethoxyalkanols.

Like the products disclosed in the said U.S. Patent No. 2,903,486, the products of the present invention are low viscosity polypropylene oxide terminated non-ionic surfactants which exhibit good detergency, low foam, good wetting characteristics, and stability in built formulations. With such surfactants, wetting efficiency and foaming tendencies are very temperature dependent, a condition which can be categorized in terms of a given composition's cloud point. This point is the temperature at which a 1% aqueous solution of the composition, which has been heated until it became turbid and then allowed to cool in air, suddenly becomes clear.

Generally speaking, as the temperature of such surfactants is increased above their cloud points their tendency to foam drops off and, if decreased below their cloud points, the foaming increases and may become excessive. On the other hand, such surfactants exhibit good wetting below their cloud points, particularly down around room temperatures. However, when these compounds are employed at temperatures much above their cloud points, say over 10° above, they are unsatisfactory wetters.

Propylene oxide terminated non-ionics such as the alkylphenoxypolyethoxyalkanols disclosed in U.S. Patent No. 2,903,486 thus are good from a low foaming standpoint only when used at relatively high temperatures of about 30° C. (their lowest cloud point) or higher. They are also good wetters, either below their cloud point or up to about 10° C. above it. But the combination of low foaming and good wetting properties in such compounds is thus only available when they are employed at the aforesaid relatively high temperatures. It is impossible to get the same combination of desired properties when the compositions are used at room temperatures, say around 20°–25° C.

Compositions of the type disclosed in U.S. Patent No. 2,903,486 are particularly suited for use in automatic dishwashing and like processes wherein high temperatures, such as 40°–50° C. are employed, and low foaming is essential. However, when those compositions are employed at temperatures below 40° C., and particularly at 15°–25° C., they foam copiously and cannot be used in any application where low foaming is essential. Accordingly, such products have not been suited for use in certain spray metal cleaning and textile processing applications where the use of low temperatures and high wetting is all-important. The products of the present invention, by comparison, fill both of those requirements very satisfactorily, thereby providing a solution to the problem which their predecessors in the surfactant art did not meet.

As will be indicated from the data set forth below, the present compositions are extremely useful low foam penetrants at temperatures as low as 15°–30° C. Although the reasons why the present compounds are able to succeed where other polypropylene oxide terminated alkylphenoxypolyethoxyalkanols have failed are not entirely clear, it is apparent that the described unexpected effect is the result of the relatively narrow ranges of oxyethylene and oxypropylene, as well as the unique and highly critical ratio of the latter to the former.

In evaluating the performance of the new compositions, two well established tests were used, one for determining the degree of foaming tendency and the other for determining the wetting or penetrating ability. The former is a method which has been named the "Hamilton-Beach Foam Test" and is performed essentially as follows.

The apparatus consists of a well-known Hamilton-Beach electrically driven mixing apparatus which is inserted into a glass tube (sealed at the bottom end). In the tube are four stainless steel baffle plates held vertically. The glass tube is immersed in a water bath which maintains the temperature within 0.5° C. of the test temperature (in this case, between 15°–30° C.). The mixer blades are centered in the tube with the upper blade ½ inch above the solution surface. The 200 ml. of 0.1% test solution is equilibrated to temperature and then mixed at high speed (14,500 r.p.m.) for 3 minutes. The mixer is stopped and the foam height recorded after 15 seconds. A foam height of less than 5.5 cm. is considered acceptable, and anything over that value is deemed unacceptable. Each test is usually run in duplicate.

The widely known Draves test was employed to determine the wetting efficiency of the compositions. In this test, there is measured the amount of wetting agent needed to wet a standard cotton skein in 25 seconds. The amount of a compound needed to accomplish this wetting is a measure of its efficiency and acceptability. Acceptable textile wetting agents need be present in amounts by weight usually no higher than about 0.06% when tested below their cloud points. Under such conditions, the compounds of this invention gave values in the range of 0.04 to 0.06%. But, in addition, the present compounds gave values of 0.06 to 0.07% at a few degrees above their cloud points and values of less than 0.10% even when tested at temperatures up to about 10° C. above their cloud points. Thus, our compositions have the unique dual characteristic of being good wetters at the relatively low temperatures at which they are also good low foamers.

If desired, the compounds of this invention may be built into useful formulations by employing borates, carbonates, silicates, phosphates, and the like in known ways. These formulations are effective and stable.

The compounds of this invention are prepared by well-known methods. In essence, the octyl or nonyl phenol is reacted with ethylene oxide in the temperature range of 130° to 210° C. in the presence of a strong basic catalyst and under a pressure of up to about 30 pounds per square inch gauge. Subsequently, propylene oxide is introduced in a similar way, although the addition may be made concurrently. The product is isolated by neutralizing the catalyst, then steam stripping until residual oxide odors disappear, followed by removal of the water under reduced pressure.

By following the general procedure set forth above and varying the quantities of reactants in order to obtain different amounts of the ethylene oxide or propylene oxide as desired in the final composition, the compounds shown in Table I were prepared. Also included in that table, for purposes of comparing the foaming tendencies with the compositions of the present invention, is one of the preferred low-foaming polypropylene oxide terminated nonionic compounds disclosed in the aforesaid U.S. Patent No. 2,903,486.

TABLE I

| Composition | Ratio, P/E | Cloud Point, 1% in H₂O | Hamilton-Beach Foam (15°–28°, 15 sec.) | |
|---|---|---|---|---|
| | | | Temp. (° C.)* | Foam (cm.) |
| 1. $OPE_5P_{5.8}$ | 1.16 | 15 | 17 | 3.8 |
| 2. $NPE_6P_7$ | 1.17 | 19 | 21 | 2.5 |
| 3. $OPE_{9.7}P_{12.2}$ | 1.26 | 26 | 28 | 5.0 |
| 4. $OPE_{8.5}P_{11.3}$ | 1.33 | 23 | 25 | 3.2 |
| 5. $OPE_{7.4}P_{13}$ | 1.75 | 19 | 21 | 3.8 |
| 6. $NPE_{8.1}P_{15.4}$ | 1.91 | 19 | 21 | 4.0 |
| 7. $OPE_5P_{10.2}$ | 2.04 | 13 | 15 | 5.2 |
| 8. $OPE_{9.7}P_{20}$ | 2.06 | 17 | 19 | 4.0 |
| 9. $OPE_{8.5}P_{4.5}$ | **0.5 | 40 | 20 | >14 |

Notes:
OP = Octylphenol.
NP = Nonylphenol.
E = Ethylene oxide.
P = Propylene oxide.
(*) = Temperature is, in each instance, 2° C. above the cloud point of the particular compositions except for No. 9.
(**) = Ratio outside required range (actually a composition disclosed in U.S. Patent No. 2,903,486).

In Table I, all the compositions above the horizontal dotted line will be seen to give acceptable low foam results at temperatures below 30° C., i.e., a foam of less than 5.5 cm., whereas that below the dotted line is in excess of that amount and therefore is unacceptable. The compositions of the low-foaming polyoxypropylene terminated non-ionics of the prior art represented by No. 9 show a foaming tendency in excess of the critical limits by more than 150%.

It will be noted that all the foam tests were made at temperatures between 15°–28° C., each test (except of compound No. 9) being run at a temperature which was 2° above the cloud point of the particular compound. This was done in order to have a uniform basis for comparison of the various compositions. Composition No. 9, representing the prior art, has a cloud point considerably above the low temperatures which are objectives of the present compounds. Thus, it was tested at room temperature, which is approximately midway in the range of temperatures within which it is desired to employ the surfactants of this invention.

It should be pointed out that when the compositions have a P/E ratio above the aforesaid maximum of 2.1, the desired low-foaming properties are obtained but the wetting is unsatisfactory (i.e., over 0.1%). To illustrate, a compound having the composition $OPE_{8.5}P_{20.2}$ was found to have a wetting value of 0.12%, when tested at 10° above its cloud point, although it passed the foam test. When the value for P/E is below the aforesaid minimum of 1.2, the desired wetting is obtained but low-foaming properties at around room temperatures cannot be accomplished. This last is illustrated by Example 9 in Table I.

Our novel compositions are highly useful in such applications as metal cleaning by the spray, as opposed to the dip, technique. It also has particular utility as a wetting agent in such processing as the coating of rugs, upholstery, and awnings with compound lattices, warp sizing, dyeing aids, and printing assistants. Use for our compounds also exists in paper and leather processing, in agricultural sprays (as emulsions or wettable powders), and as a low-foam emulsifier for emulsion polymerization.

The following example illustrates the effectiveness of the present compounds in the various applications for which it can be put to use. It describes the use of an alkaline metal cleaner containing a compound of our invention in connection with the spray treatment for removal of oil from steel at low temperatures, comparing it with a similar alkaline material which is minus our unique composition.

*Example*

Three solvent pre-cleaned, mild steel panels were coated with SAE 40 motor oil, rotated for 10 minutes in a 2% detergent solution which was maintained at a temperature of about 28° C., rinsed in cold water, then sprayed with water and the percent of surface area free of water break was estimated. The detergent base consisted of 30 parts caustic, 30 parts sodium metasilicate pentahydrate, and 35 parts soda ash. The cleaning efficiency was rated at "0%," indicating that the surfaces of the steel panels still were entirely covered by oil. Another set of similar steel panels was likewise oil-coated and detergent-treated, except that in this instance the detergent additionally contained 5 parts of a composition of the present invention (actually surfactant No. 5 in Table I). The result was a cleaning efficiency rating of "70%," meaning that, based on a total of six surfaces of the three test panels, an average of 70% of the total area of the panels was free of residual oil.

We claim:

1. As a composition of matter, the compound having the formula

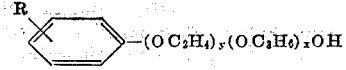

in which R is an alkyl group of 8 to 9 carbon atoms, $x$ is a number ranging from 5.8 to 20, $y$ is an integer ranging from 5 to 10, and $x/y$ is a ratio which may be represented by a number from about 1.2 to about 2.1.

2. As a composition of matter,

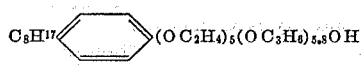

3. As a composition of matter,

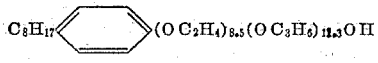

4. As a composition of matter,
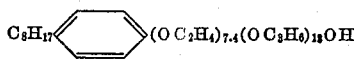
5. As a composition of matter,
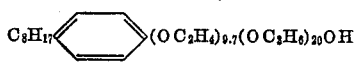
6. As a composition of matter,
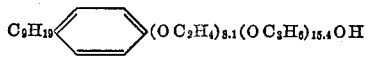
References Cited in the file of this patent
UNITED STATES PATENTS
2,903,486    Brown et al. _____ Sept. 8, 1959